(12) United States Patent
Landi Adib et al.

(10) Patent No.: US 12,736,151 B2
(45) Date of Patent: Sep. 15, 2026

(54) PNEUMATIC ACTUATOR ASSEMBLY FOR REDUCED DEAD LEG

(71) Applicant: Repligen Corporation, Waltham, MA (US)

(72) Inventors: Anthony Mauricio Landi Adib, Waterford (IE); Patrick Lyng, Kilkenny (IE)

(73) Assignee: Repligen Corporation, Waltham, MA (US)

( * ) Notice: Subject to any disclaimer, the term of this patent is extended or adjusted under 35 U.S.C. 154(b) by 0 days.

(21) Appl. No.: 18/901,774

(22) Filed: Sep. 30, 2024

(65) Prior Publication Data

US 2025/0116349 A1 Apr. 10, 2025

Related U.S. Application Data

(60) Provisional application No. 63/588,848, filed on Oct. 9, 2023.

(51) Int. Cl.

| | |
|---|---|
| ***F16K 31/122*** | (2006.01) |
| ***F16K 7/07*** | (2006.01) |
| *F16K 7/06* | (2006.01) |
| *F16K 11/22* | (2006.01) |
| *F16K 27/00* | (2006.01) |
| *F16K 27/02* | (2006.01) |

(52) U.S. Cl.

CPC ............ *F16K 31/1221* (2013.01); *F16K 7/07* (2013.01); *F16K 7/06* (2013.01); *F16K 11/22* (2013.01); *F16K 27/003* (2013.01); *F16K 27/0236* (2013.01)

(58) Field of Classification Search

CPC .......... F16K 31/1221; F16K 7/07; F16K 7/06; F16K 11/22; F16K 27/0236; F16K 27/003

USPC ................................ 251/62; 137/269, 315.27

See application file for complete search history.

(56) References Cited

U.S. PATENT DOCUMENTS

| | | | | |
|---|---|---|---|---|
| 4,687,017 A * | 8/1987 | Danko | ..................... F16J 15/04 | 251/63.5 |
| 4,711,268 A * | 12/1987 | Coleman | ................ F16K 11/22 | 73/756 |
| 4,995,589 A | 2/1991 | Adishian | | |

(Continued)

FOREIGN PATENT DOCUMENTS

| | | |
|---|---|---|
| AU | 2016332061 A1 | 4/2018 |
| GB | 847362 A | 9/1960 |

OTHER PUBLICATIONS

The International Search Report and Written Opinion mailed Dec. 19, 2024 for PCT/US2024/049237 (19 pages).

*Primary Examiner* — Minh Q Le

(74) *Attorney, Agent, or Firm* — KDW Firm PLLC

(57) ABSTRACT

The disclosure is directed to pneumatic actuator assemblies for reduced dead leg. In one approach, an assembly may include a valve body, and a first actuator and a second actuator each coupled to the valve body by a bonnet assembly. The bonnet assembly may include a bonnet body having a first end opposite a second end, wherein the first end is connected with the valve body, and a nut threadedly connected to the second end of the bonnet body. The bonnet assembly may further include an actuator bonnet, wherein the nut partially surrounds the actuator bonnet, and wherein the actuator bonnet is rotatable about a lengthwise axis extending through a center of a stem of a piston.

18 Claims, 9 Drawing Sheets

(56) References Cited

U.S. PATENT DOCUMENTS 5,186,434 A * 2/1993 Nishimura ................ F16K 7/14
251/368
5,277,224 A * 1/1994 Hutton ................ G01L 19/0015
137/884
5,823,228 A * 10/1998 Chou .................... F16K 27/003
137/557
5,913,504 A * 6/1999 Nishimura ............ F16K 31/122
251/62
6,035,893 A * 3/2000 Ohmi .................... F16K 27/003
137/884
7,225,832 B2 * 6/2007 Stamler ................. F16K 27/003
137/597
10,724,644 B2 7/2020 Aoyama
11,231,120 B2 1/2022 Gagne
2004/0094740 A1 * 5/2004 Itoi ........................... F16K 1/42
251/331
2010/0163765 A1 * 7/2010 Gregoire ............. F16K 31/1226
251/62
2012/0285541 A1 * 11/2012 Hutton ................ G01L 19/0015
137/197
2013/0181148 A1 * 7/2013 Tokuda ............... F16K 31/1221
251/63.6
2014/0097365 A1 4/2014 Young
2017/0016544 A1 1/2017 Chiba
2017/0335981 A1 * 11/2017 Koyama ................... F16K 7/16
2018/0112788 A1 * 4/2018 Ishibashi ............. F16K 27/0236
2018/0274689 A1 * 9/2018 Gagne ................. F16K 27/0236
2021/0285552 A1 9/2021 Kondo

* cited by examiner

FIG. 8

PNEUMATIC ACTUATOR ASSEMBLY FOR REDUCED DEAD LEG

CROSS-REFERENCE TO RELATED APPLICATIONS

This is a non-provisional of pending provisional patent application Ser. No. 63/588,848, filed Oct. 9, 2023, the entirety of which application is incorporated by reference herein.

BACKGROUND OF THE DISCLOSURE

Field of the Disclosure

The present disclosure relates generally to pinch clamps or valves and, more particularly, to a pneumatic actuator assembly for reduced dead leg.

Discussion of Related Art

Valves and clamps are well known for use in fluid flow control applications. Pinch valves are generally used with a length of tubing of a flexible material that carries the fluid, wherein the pinch valve is pressed against the tubular element to fully or partially modify flow of the fluid therethrough.

When pinch valves are used in the pharmaceutical industry, for example, dead leg requirements become an important design consideration. “Dead leg” is a term used to describe an area of entrapment in a vessel or piping run where system design and operating conditions result in insufficient process fluid flow, presenting a risk for particulate, chemical, and/or biological contamination. To mitigate dead leg, multiple pneumatic actuators may be provided in a same valve body, forming a manifold. When configured this way, it is desirable to bring the actuators as close as possible to each other to reduce the dead leg to an acceptable minimum value.

Current designs often use a tri-clamp connection, which makes it more difficult to position the actuators physically close to one another, as the clamp occupies a large space around a flange of each actuator. In addition, the clamp requires space to carry out the kinematics of the assembly. This is often seen in smaller actuators applied in systems where the dead leg requirement is more difficult to meet. It is with respect to these and other deficiencies of the prior art that the present disclosure is provided.

SUMMARY OF THE DISCLOSURE

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

Exemplary approaches provided herein are directed to pneumatic actuator assemblies for reduced dead leg. In one approach, an assembly may include a valve body, and a first actuator and a second actuator each coupled to the valve body by a bonnet assembly. The bonnet assembly may include a bonnet body having a first end opposite a second end, wherein the first end is connected with the valve body, and a nut threadedly connected to the second end of the bonnet body. The bonnet assembly may further include an actuator bonnet, wherein the nut partially surrounds the actuator bonnet, and wherein the actuator bonnet is rotatable about a lengthwise axis extending through a center of the piston stem.

In another approach, a pneumatic actuator assembly may include a valve body comprising a fluid passageway, and a first actuator and a second actuator each coupled to the valve body by a bonnet assembly. The bonnet assembly may include a bonnet body having a first end opposite a second end, wherein the first end is connected with the valve body, and a nut threadedly connected to the second end of the bonnet body. The bonnet assembly may further include an actuator bonnet, wherein the nut partially surrounds the actuator bonnet, and a bushing within the actuator bonnet and the nut, wherein the bushing surrounds a stem of a piston, and wherein the actuator bonnet is rotatable about a lengthwise axis extending through a center of the piston stem.

In yet another approach, a method of operating a pneumatic actuator assembly may include coupling a first actuator to a valve body using a first bonnet assembly and coupling a second actuator to the valve body using a second bonnet assembly, wherein the first bonnet assembly includes a bonnet body having a first end opposite a second end, and wherein the first end is connected with the valve body. The first bonnet assembly may further include a nut threadedly connected to the second end of the bonnet body, an actuator bonnet, wherein the nut partially surrounds the actuator bonnet, and a bushing within the actuator bonnet and the nut, wherein the bushing surrounds a stem of a piston. The method may further include rotating the actuator bonnet about a lengthwise axis extending through a center of the piston stem to position an air connection port of a housing of the first actuator, wherein the actuator bonnet rotates relative to the nut and to the bonnet body.

BRIEF DESCRIPTION OF THE DRAWINGS

The accompanying drawings illustrate exemplary approaches of the disclosed armored cable assembly so far devised for the practical application of the principles thereof, and in which:

FIG. 8 is a flowchart of a method for assembling a pneumatic actuator assembly, according to examples of the present disclosure.

Figure 1:
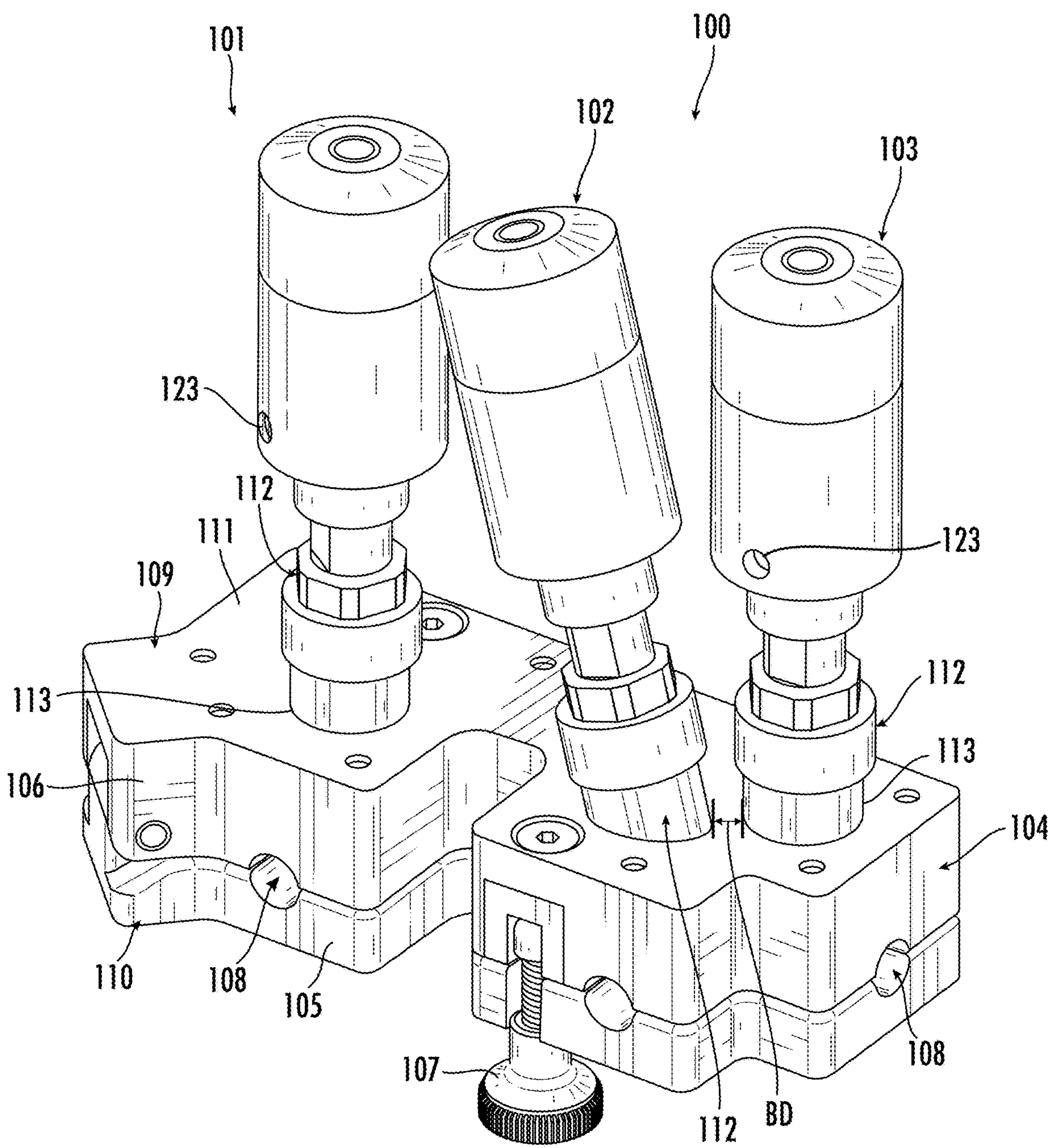
FIG. 1 is a perspective view of a pneumatic actuator assembly, according to examples of the present disclosure.

The drawings are not necessarily to scale. The drawings are merely representations, not intended to portray specific parameters of the disclosure. The drawings are intended to depict exemplary examples of the disclosure, and therefore are not to be considered as limiting in scope. In the drawings, like numbering represents like elements.

Furthermore, certain elements in some of the figures may be omitted, or illustrated not-to-scale, for illustrative clarity. The cross-sectional views may be in the form of "slices", or "near-sighted" cross-sectional views, omitting certain background lines otherwise visible in a "true" cross-sectional view, for illustrative clarity. Furthermore, for clarity, some reference numbers may be omitted in certain drawings.

Description of Examples

The present disclosure will now proceed with reference to the accompanying drawings, in which various approaches are shown. It will be appreciated, however, that the disclosed armored cable assembly may be embodied in many different forms and should not be construed as limited to the approaches set forth herein. Rather, these approaches are provided so that this disclosure will be thorough and complete, and will fully convey the scope of the disclosure to those skilled in the art. In the drawings, like numbers refer to like elements throughout.

To address the above identified drawbacks of the prior art, examples of the present disclosure provide an actuator assembly having one or more bonnet assemblies, which allow pinch valves to be located more closely to each other for smaller diameter flow paths such that pinching locations can be close to each other to reduce dead leg volumes. Tilted actuators allow for even closer proximity between pinching locations. A swivel nut of the bonnet assembly also allows for the pneumatic air/vacuum supply/return to be oriented in any direction for ease of assembly and use.

Referring now to the perspective view of FIG. 1 and to the top view of FIG. 2, an exemplary pneumatic actuator assembly (hereinafter "assembly") 100 according to examples of the present disclosure will be described in greater detail. The assembly 100 may include one or more pneumatic pinch valves used to open and close fluid flow in a tube. As shown, the assembly 100 may include a plurality of actuators 101, 102, 103 coupled to a valve body 104. Although non-limiting, the valve body 104 may include a first section 105 connected to a second section 106 by one or more fasteners 107. Extending through the valve body 104 may be a plurality of channels 108, which may include a liner, conduit, or tubing therein. Extending through the actuators 101, 102, 103 may be one or more connection ports 123, e.g., compressed air connection ports. A piston stem (not shown) of each of the actuators 101, 102, 103 may extend into the channels 108 to control flow of a fluid therethrough.

The valve body 104 may define a first main side 109 opposite a second main side 110, wherein the plurality of actuators 101, 102, 103 extend above a plane defined by a top surface 111 of the first main side 109. As will be described in greater detail herein, a bonnet assembly 112 of each of the plurality of actuators 101, 102, 103 may be positioned within an opening 113 through the first main side 109.

Figure 2:
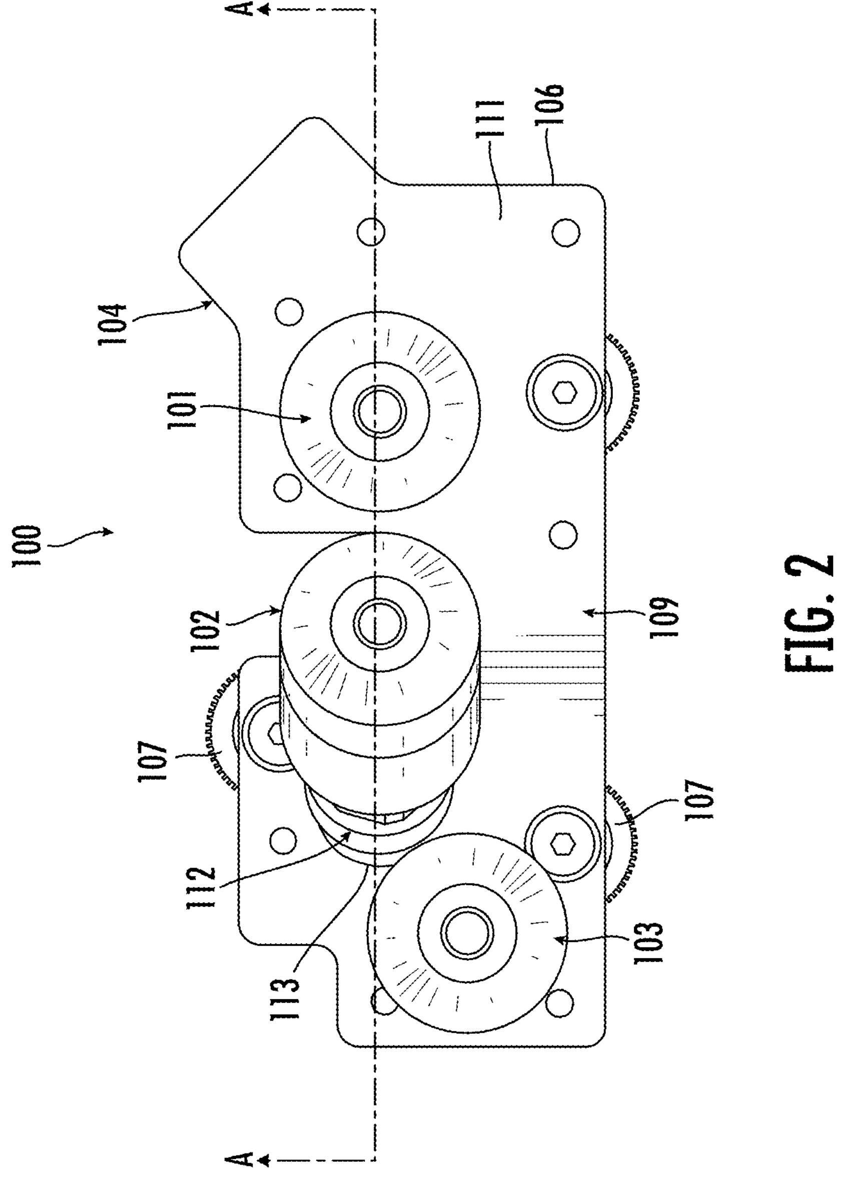
FIG. 2 is a top view of the pneumatic actuator assembly, according to examples of the present disclosure.
Figure 3:
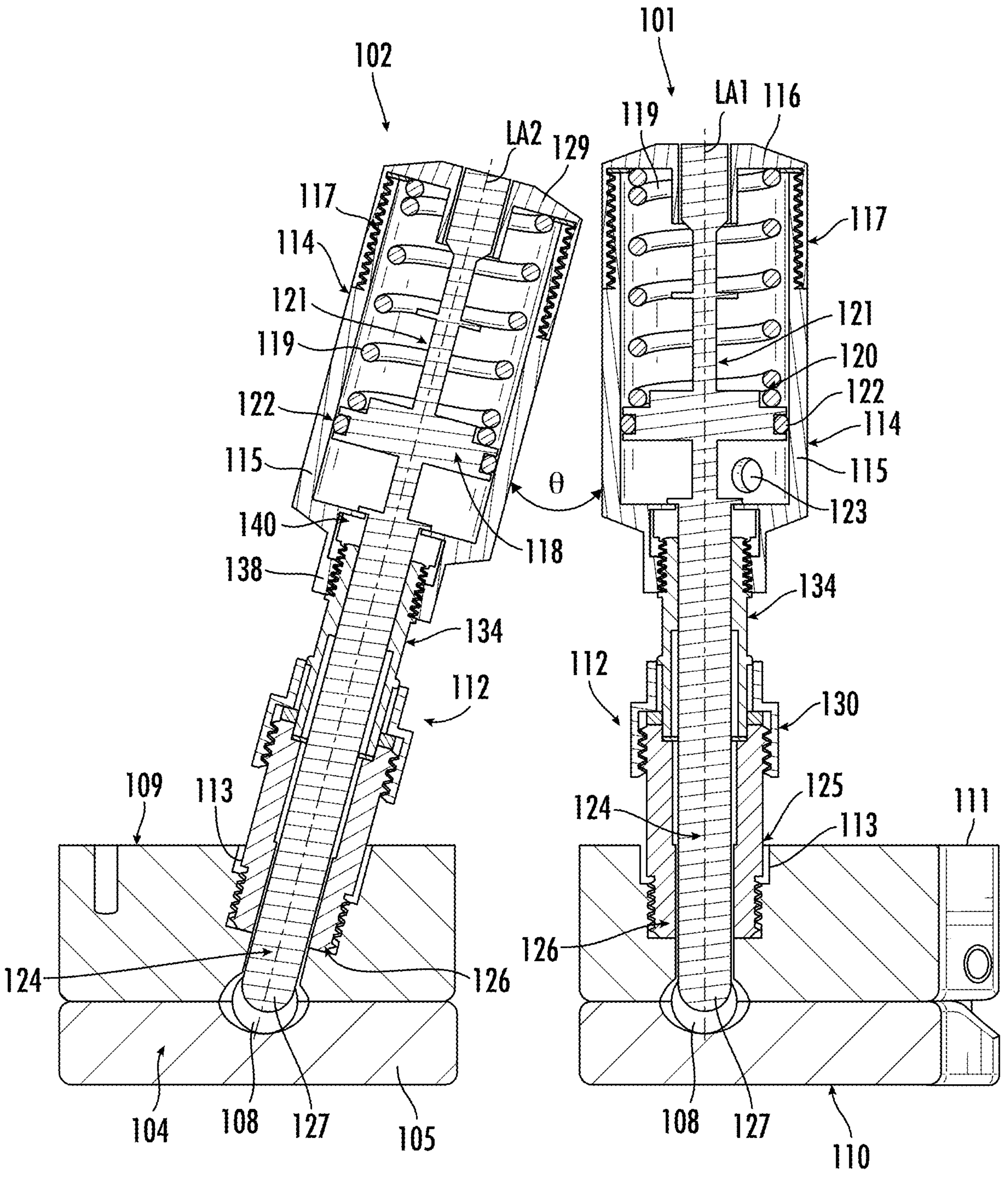
FIG. 3 is a side cross-sectional view of the pneumatic actuator assembly, according to examples of the present disclosure.

FIG. 3 is a cross-sectional view of the assembly 100 along cutline A-A of FIG. 2. As shown, each of the actuators 101, 102 may include a housing 114 having a sidewall 115 and a cap 116, wherein the sidewall 115 and the cap 116 are coupled together by complimentary threading 117. Extending through the housing 114 is a piston 118 and a spring 119, wherein the spring 119 extends around an indicator rod 121 of the piston 118 and is positioned between a head 120 of the piston 118 and an underside of the cap 116. The head 120 may form a seal with an inner surface of sidewall 115 using an O-ring 122 or other similar device. As shown, the connection port(s) 123 is positioned below the head 120 of the piston 118. A stem tip 127 of each stem 124 may extend into the channel 108 to modify flow of a fluid therethrough. A head tip 129, which is located above the indicator rod 121, may be coupled with the cap 116. For example, each cap 116 may have a central opening into which the head tip 129 is inserted. As such, the head tip 129 may act as a plug.

As further shown, each bonnet assembly 112 may be secured to the valve body 104 by a bonnet body 125, wherein a first end 126 of the bonnet body 125 has external threading operable to engage corresponding internal threading of the opening(s) 113 of the valve body 104. As shown, each stem 124 may extend through the bonnet body 125 and into the channel 108. A second end 128 of the bonnet body 125 may be secure to a nut 130. In some embodiments, the nut 130 and the second end 128 of the bonnet body 125 may be threadedly connected to one another. As shown, an outer diameter of the first end 126 of the bonnet body 125 may be different than an outer diameter of the second end 128 of the bonnet body 125 to prevent reverse mounting with both the valve body 104 and the nut 130. The bonnet body 125 and the nut 130 may be made of austenitic stainless steel (e.g., A316L), but can also be manufactured in other metallic or non-metallic materials.

Each bonnet assembly 112 may further include an actuator bonnet 134 surrounding the stem 124. As shown, the nut 130 partially surrounds the actuator bonnet 134, which may abut an end face of the second end 128 of the bonnet body 125. In the embodiment shown, the actuator bonnet 134 is coupled (e.g., threadedly secured) to a neck 138 of the housing 114. A sealing ring 140 may be positioned adjacent an end face of the actuator bonnet 134, within the neck 138 of the housing 114.

As further demonstrated, the first actuator 101 may define a first lengthwise axis 'LA1' extending through a center of the stem 124, between the channel 108 of the valve body 104 and the stem tip 127. The first lengthwise axis is oriented perpendicular, or substantially perpendicular, to the plane defined by the top surface 111 of the valve body 104. Meanwhile, the second actuator 102 may define a second lengthwise axis 'LA2,' extending similarly through the stem 124 of the second actuator 102. As shown, the second lengthwise axis is oriented at a non-zero angle (θ) relative to the first lengthwise axis. Although non-limiting, the non-zero angle (θ) may be less than approximately 45° in some examples. Tilting the first and/or second actuators 101, 102 allows for even closer proximity between pinching locations. For example, referring to FIG. 1, a bonnet distance ('BD') between bonnet assemblies 112 of actuators 102 and 103 may be reduced.

Figure 4:
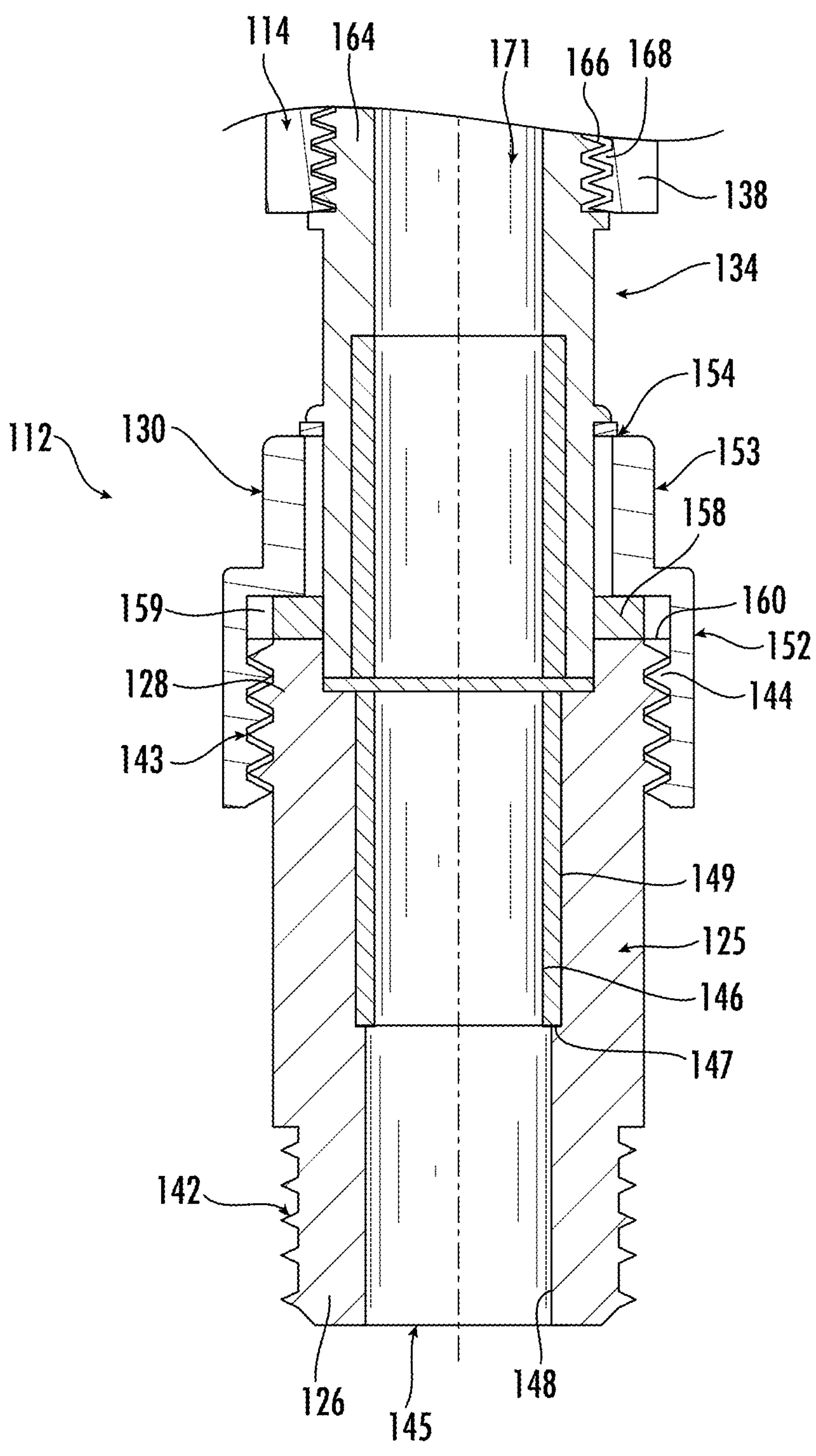
FIG. 4 is a cross-sectional view of a bonnet assembly, according to examples of the present disclosure.

FIG. 4 demonstrates the bonnet assembly 112 in greater detail. As shown, the first end 126 of the bonnet body 125 has external threading 142 operable to engage corresponding internal threading of the opening(s) 113 of the valve body 104, while the second end 128 of the bonnet body 125 has external threading 143 engaged with internal threading 144 of the nut 130. In some embodiments, the bonnet body 125 may include an internal bore 145 operable to receive the stem 124 (not shown). A first bushing 146 may also be located within the internal bore 145 and may be held in place by an internal flange 147 along an interior surface 149 of the bonnet body 125. During installation, the first bushing 146 may be inserted into the second end 128 of the bonnet body 125 until the first bushing engages the internal flange 147.

The nut 130 may have a first end 150 opposite a second end 151, and a first section 152 connected with a second section 153. In some embodiments, a diameter of the first section 152 (i.e., inner and/or outer diameter) is greater than a corresponding inner or outer diameter of the second section 153. Embodiments herein are not limited in this context, however. The internal threading 144 of the nut 130 may be located along an interior of the first section 152. In some embodiments, an optional retainer 154 may be positioned between the second end 151 of the nut 130 and a lip or flange 155 of the actuator bonnet 134 to prevent/restrict movement between the nut 130 and the actuator bonnet 134.

As further shown, the actuator bonnet 134 may include an exterior flange 158 positioned within a cavity 159 between the first section 152 and the second section 153 of the nut 130. More specifically, the exterior flange 158 may be in abutment with both the nut 130 and an end face 160 of the second end 128 of the bonnet body 125. In the embodiment shown, a first end 164 of the actuator bonnet 134 has external threading 166 for engagement with corresponding internal threading 168 of the neck 138 of the housing 114. A second bushing 170 may be positioned within an internal bore 171 of the actuator bonnet 134. The second bushing 170 may engage an internal flange of the actuator bonnet 134 to limit travel of the second bushing 170 within the internal bore 171. In other embodiments, only a single bushing is present, which extends within both the internal bore 171 of the actuator bonnet 134 and the internal bore 145 of the bonnet body 125. After assembly, the actuator bonnet 134 and the housing 114 are rotatable relative to the nut 130 and to the bonnet body 125.

Figure 5A:
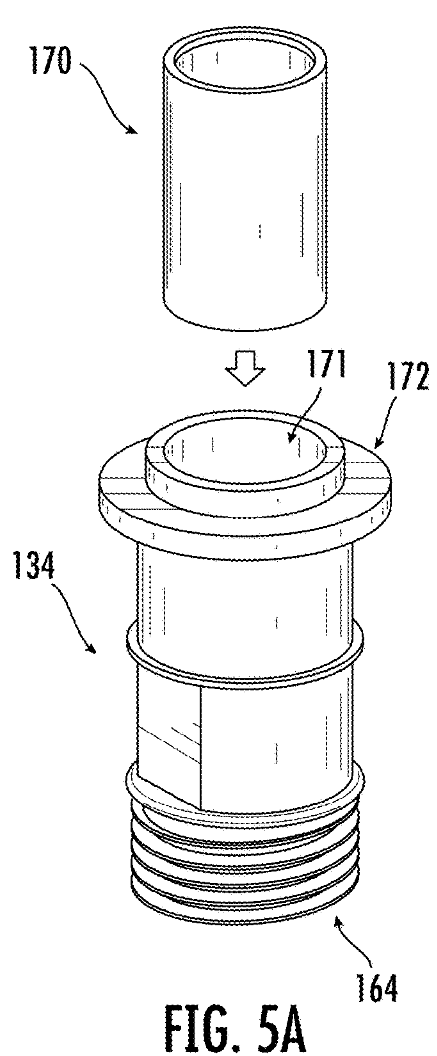
FIGS. 5A-5D demonstrate an approach for assembling a portion of a bonnet assembly, according to examples of the present disclosure.

Turning now to FIGS. 5A-5D, one possible approach for assembling a portion of the bonnet assembly 112 will be described. As shown in FIG. 5A, the second bushing 170 may be inserted through a second end 172 of the actuator bonnet 134 and into the internal bore 171. In some embodiments, an internal stop or flange may be provided along an interior surface of the actuator bonnet 134 to limit the second bushing 170 from being inserted too close to the first end 164 of the actuator bonnet 134.

Figure 5B:
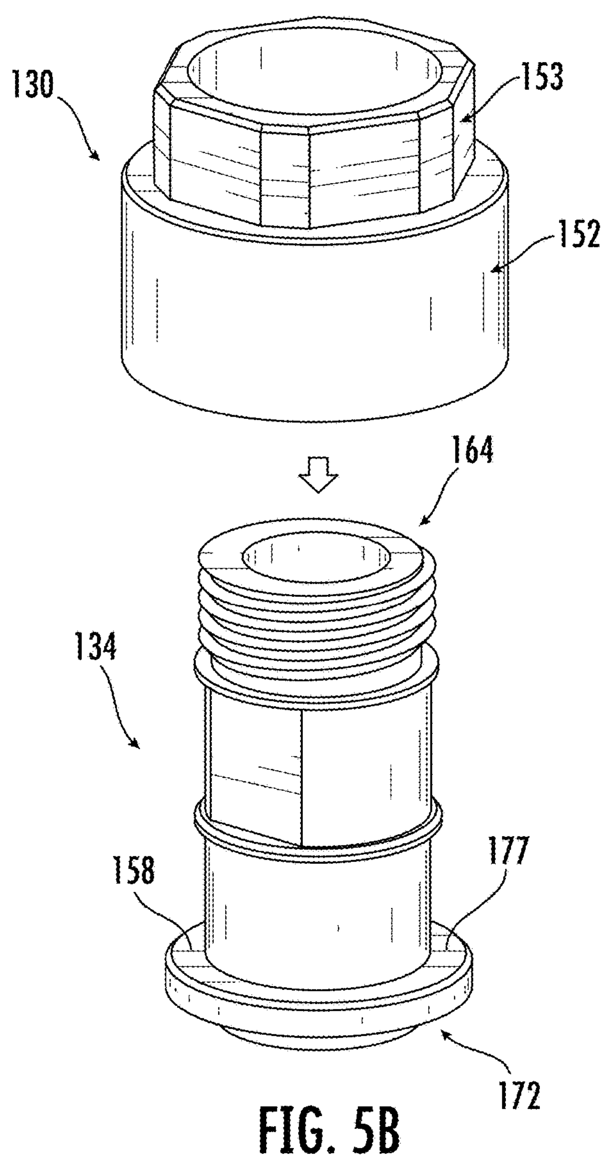

As shown in FIG. 5B, the nut 130 may be placed over the first end 164 of the actuator bonnet 134 until the nut 130 engages the exterior flange 158 at the second end 172 of the actuator bonnet 134. During assembly, the first section 152 of the nut 130 may pass by the exterior flange 158. The reduced diameter of the second section 153 of the nut 130, however, causes an interior of the second section 153 of the nut 130 to engage an upper surface 177 of the exterior flange 158.

Figure 5C:
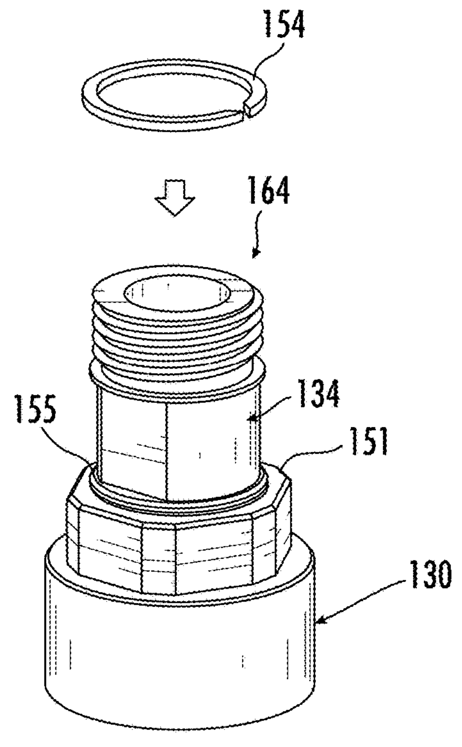

As shown in FIG. 5C, the retainer 154 may be secured about the actuator bonnet 134, e.g., between the second end 151 of the nut 130 and the flange 155 of the actuator bonnet 134. In some embodiments, the retainer 154 may include a break or opening to permit flexing of the retainer 154 during assembly. In some embodiments, the retainer 154 is not used.

Figure 5D:
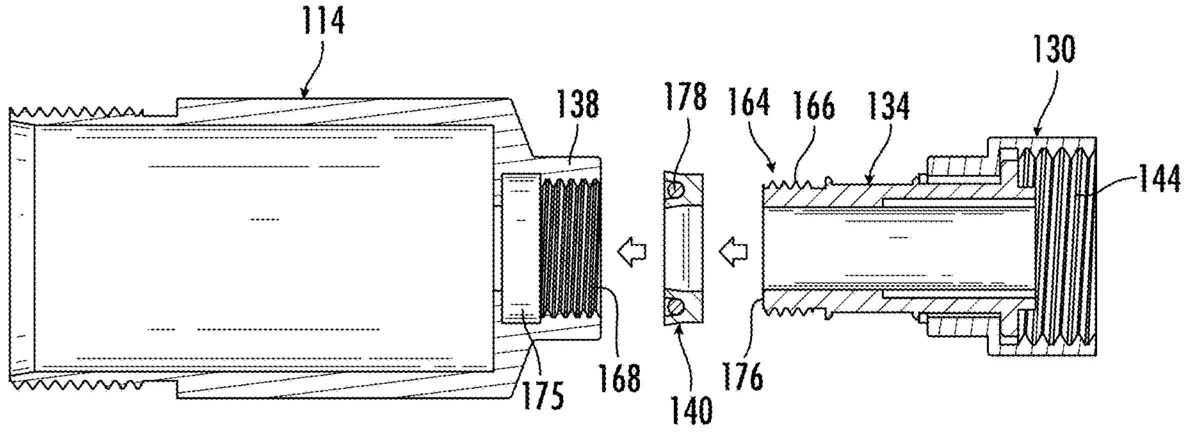

As shown in FIG. 5D, the sealing ring 140 may be positioned adjacent an end face 176 of the first end 164 of the actuator bonnet 134, and both the sealing ring 140 and the first end 164 of the actuator bonnet 134 are inserted into the neck 138 of the housing 114. More specifically, the sealing ring 140 may be inserted/pressed into a recess 175, and the external threading 166 of the actuator bonnet 134 may be rotated against the internal threading 168 of the housing 114. In some embodiments, sealing ring 140 may include a cylindrical body and an O-ring 178. Although not shown, the bonnet body 125 may then be secured to the nut 130 via threading 144, and the bonnet body 125 maybe secured to the valve body 104.

Figure 6:
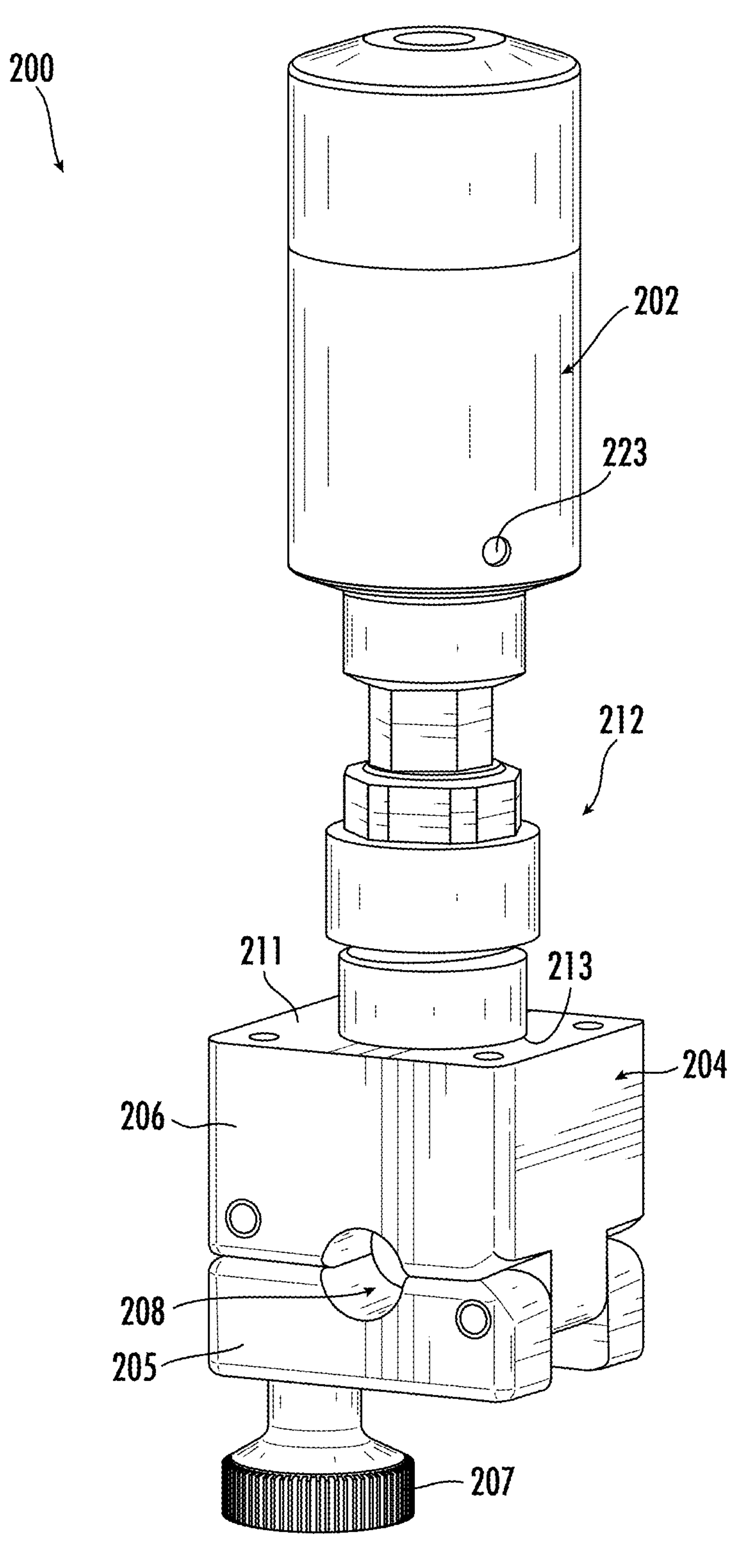
FIG. 6 is a perspective view of a pneumatic actuator assembly, according to examples of the present disclosure.

Referring now to FIG. 6, a portion of an actuator assembly (hereinafter "assembly") 200 according to another embodiment will be described. The assembly 200 may be the same or similar in many aspects to the assembly 100 described above. As such, only certain aspects of the assembly 200 will hereinafter be described for the sake of brevity. As shown, the assembly 200 may include one or more actuators 202 coupled to a valve body 204. Although non-limiting, the valve body 204 may include a first section 205 connected to a second section 206 by one or more fasteners 207. Extending through the valve body 204 may include one or more channels 208. Extending through the actuator 202 may be one or more connection ports 223, e.g., compressed air connection ports. A piston stem (not shown) of the actuator 202 may extend into the channel 208 to control flow of a fluid therethrough. The actuator 202 may extend above a plane defined by a top surface 211 of the second section 206 of the valve body 204. As will be described in greater detail herein, a bonnet assembly 212 of each of the actuator 202 may be positioned within an opening 213 of the valve body 204.

Figure 7:
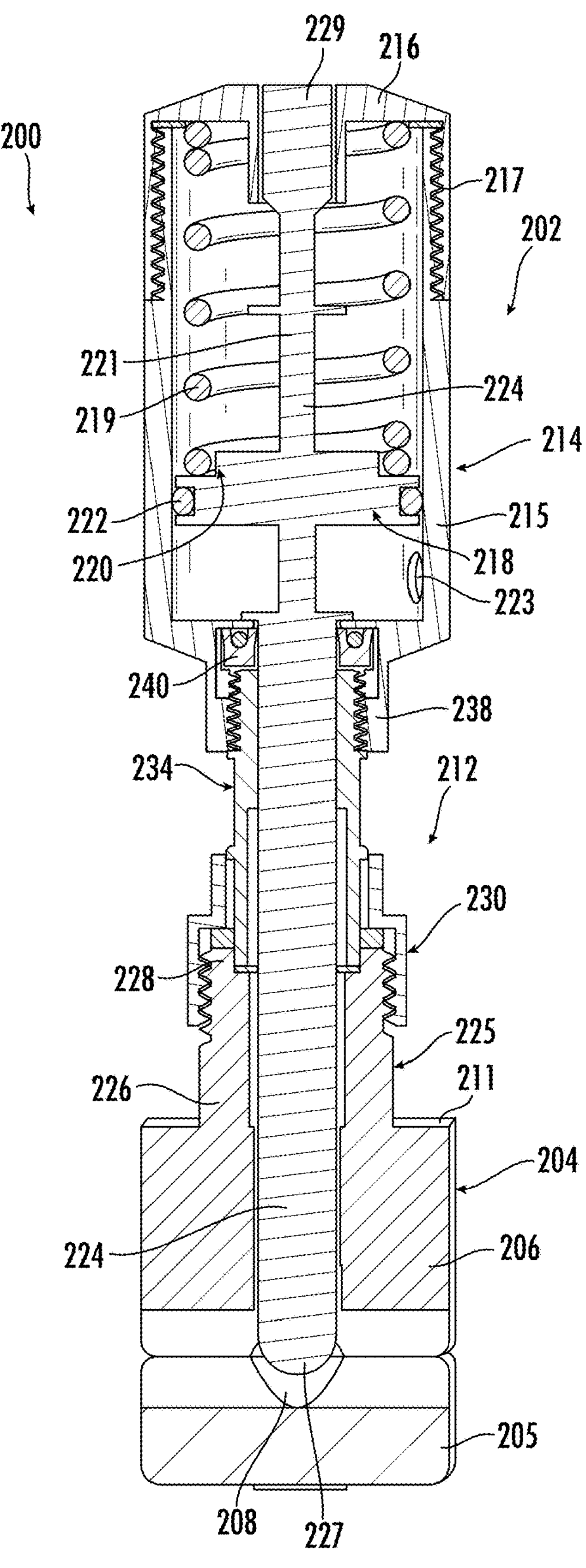
FIG. 7 is a side cross-sectional view of the pneumatic actuator assembly, according to examples of the present disclosure.

As shown in FIG. 7, the actuator 202 may include a housing 214 having a sidewall 215 and a cap 216, wherein the sidewall 215 and the cap 216 are coupled together by complimentary threading 217. Extending through the housing 214 is a piston 218 and a spring 219, wherein the spring 219 extends around an indicator rod 221 of the piston 218 and is positioned between a head 220 of the piston 218 and an underside of the cap 216. The head 220 may form a seal with an inner surface of the sidewall 215 using an O-ring 222 or other similar device. As shown, the connection port(s) 223 is positioned below the head 220 of the piston 218. A stem tip 227 of the stem 224 may extend into the channel 208 to modify flow of a fluid therethrough. A head tip 229, which is located above the indicator rod 221, may be coupled with the cap 216. For example, the cap 216 may have a central opening into which the head tip 229 is inserted.

As further shown, the bonnet assembly 212 may be secured to the valve body 204 by a bonnet body 225, wherein a first end 226 of the bonnet body 225 is integrally formed with the valve body 204. As shown, the stem 224 may extend through the bonnet body 225 and into the channel 208. A second end 228 of the bonnet body 225 may be secure to a nut 230. In some embodiments, the nut 230 and the second end 228 of the bonnet body 225 may connected by complimentary threading.

The bonnet assembly 212 may further include an actuator bonnet 234 surrounding the stem 224. As shown, the nut 230 partially surrounds the actuator bonnet 234, which may be about an end face of the second end 228 of the bonnet body 225. In the embodiment shown, the actuator bonnet 234 is coupled (e.g., threadedly secured) to a neck 238 of the housing 214. A sealing ring 240 may be positioned adjacent an end face of the actuator bonnet 234, within the neck 238 of the housing 214.

Although only a single actuator 202 is shown, multiple actuators may be present in the assembly 200 in other embodiments. Furthermore, although the actuator 202 is shown as extending perpendicular to the valve body 204, the actuator 202 may alternatively extend at an angle (e.g., between 25°-75° relative to a perpendicular extending from the top surface 211 of the valve body 204.

Figure 8:
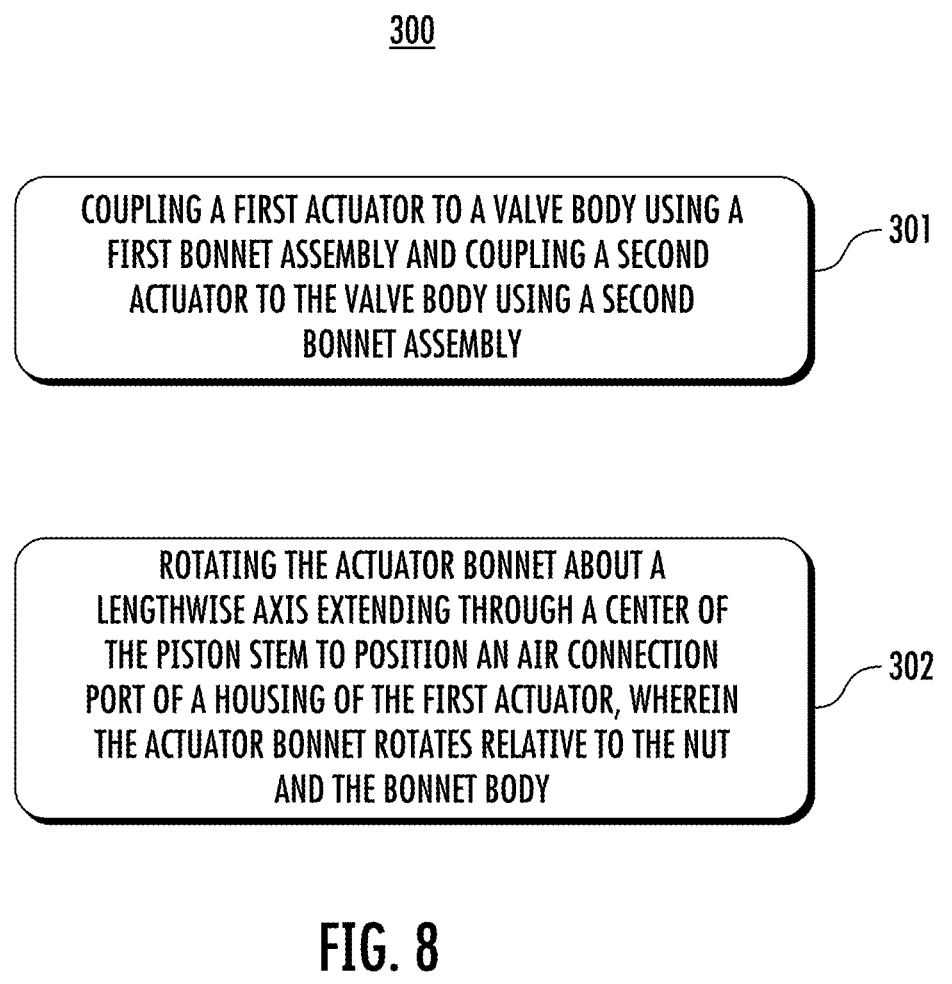

FIG. 8 demonstrates a method 300 operating a pneumatic actuator assembly, such as assemblies 100 and 200 described herein. At block 301, the method 300 may include coupling a first actuator to a valve body using a first bonnet assembly and coupling a second actuator to the valve body using a second bonnet assembly. The first bonnet assembly may include a bonnet body having a first end opposite a second end, wherein the first end is connected with the valve body, a nut threadedly connected to the second end of the bonnet body, and an actuator bonnet, wherein the nut partially surrounds the actuator bonnet. The first bonnet assembly may further include a bushing within the actuator bonnet and the nut, wherein the bushing surrounds a stem of a piston.

In some embodiments, the method 300 may include threadably connecting the first end of the bonnet body to the valve body. In some embodiments, the method 300 may include orienting the first actuator perpendicular to a plane defined by the top surface of the valve body, and orienting the second actuator at a non-zero angle relative to the first actuator. In some embodiments, the method 300 may include coupling a first end of the actuator bonnet to the housing. In some embodiments, the method 300 may further positioning the nut in abutment with an exterior flange of the actuator bonnet.

At block 302, the method 300 may include rotating the actuator bonnet about a lengthwise axis extending through a center of the piston stem to position or orient an air connection port of a housing of the first actuator, wherein the actuator bonnet rotates relative to the nut and to the bonnet body.

The foregoing discussion has been presented for purposes of illustration and description and is not intended to limit the disclosure to the form or forms disclosed herein. For example, various features of the disclosure may be grouped together in one or more aspects, examples, or configurations for the purpose of streamlining the disclosure. However, it should be understood that various features of the certain aspects, examples, or configurations of the disclosure may be combined in alternate aspects, examples, or configurations. Moreover, the following claims are hereby incorporated into this Detailed Description by this reference, with each claim standing on its own as a separate example of the present disclosure.

As used herein, an element or step recited in the singular and proceeded with the word "a" or "an" should be understood as not excluding plural elements or steps, unless such exclusion is explicitly recited. Furthermore, references to "one example" of the present disclosure are not intended to be interpreted as excluding the existence of additional examples that also incorporate the recited features.

The use of "including," "comprising," or "having" and variations thereof herein is meant to encompass the items listed thereafter and equivalents thereof as well as additional items. Accordingly, the terms "including," "comprising," or "having" and variations thereof are open-ended expressions and can be used interchangeably herein.

The phrases "at least one", "one or more", and "and/or", as used herein, are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

All directional references (e.g., proximal, distal, upper, lower, upward, downward, left, right, lateral, longitudinal, front, back, top, bottom, above, below, vertical, horizontal, radial, axial, clockwise, and counterclockwise) are only used for identification purposes to aid the reader's understanding of the present disclosure, and do not create limitations, particularly as to the position, orientation, or use of this disclosure. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other.

Furthermore, identification references (e.g., primary, secondary, first, second, third, fourth, etc.) are not intended to connote importance or priority, but are used to distinguish one feature from another. The drawings are for purposes of illustration only and the dimensions, positions, order and relative sizes reflected in the drawings attached hereto may vary.

The terms "substantial" or "substantially," as well as the terms "approximate" or "approximately," can be used interchangeably in some examples, and can be described using any relative measures acceptable by one of ordinary skill in the art. For example, these terms can serve as a comparison to a reference parameter, to indicate a deviation capable of providing the intended function. Although non-limiting, the deviation from the reference parameter can be, for example, in an amount of less than 1%, less than 3%, less than 5%, less than 10%, less than 15%, less than 20%, and so on.

The present disclosure is not to be limited in scope by the specific examples described herein. Indeed, other various examples of and modifications to the present disclosure, in addition to those described herein, will be apparent to those of ordinary skill in the art from the foregoing description and accompanying drawings. Thus, such other examples and modifications are intended to fall within the scope of the present disclosure. Furthermore, the present disclosure has been described herein in the context of a particular implementation in a particular environment for a particular purpose. Those of ordinary skill in the art will recognize the usefulness is not limited thereto and the present disclosure may be beneficially implemented in any number of environments for any number of purposes. Thus, the claims set forth below are to be construed in view of the full breadth and spirit of the present disclosure as described herein.

What is claimed is:

1. An assembly, comprising:

a valve body having a first main side and an opposite second main side, the first main side having a top surface defining a plane; and a first actuator and a second actuator each coupled to the valve body by a respective bonnet assembly such that the first and second actuators extend from the plane defined by the top surface of the first main side;

wherein the bonnet assembly of each of the first and second actuators comprises:

a bonnet body having a first end opposite a second end, wherein the first end includes external threads;

a nut threadedly connected to the second end of the bonnet body; and an actuator bonnet, wherein the nut partially surrounds the actuator bonnet, and wherein the actuator bonnet is rotatable about a lengthwise axis extending through a center of a stem of a piston;

wherein the valve body includes first and second openings defined in the top surface, the first and second openings having internal threads for receiving the external threads of the respective first ends of the bonnet bodies of the first and second actuators; and wherein the first and second openings define respective lengthwise axes, where the lengthwise axis of the first opening is oriented perpendicular to the plane defined by the top surface of the first main side, and the lengthwise axis of the second opening is oriented at an oblique angle with respect to the plane defined by the top surface of the first main side.

2. The assembly of claim 1, wherein the bonnet body comprises an internal flange, wherein a bushing is in abutment with the internal flange, and wherein the bushing surrounds the stem of the piston.

3. The assembly of claim 1, wherein the first end of the bonnet body is threadably connected with the valve body.

4. The assembly of claim 1, wherein the first end of the bonnet body is integrally formed with the valve body.

5. The assembly of claim 1, the bonnet assembly further comprising a retainer extending around the actuator bonnet, wherein the retainer is in abutment with the nut.

6. The assembly of claim 1, wherein the actuator bonnet comprises a first end coupled to a housing.

7. The assembly of claim 1, wherein the actuator bonnet has an exterior flange, and wherein the nut is in abutment with the exterior flange.

8. The assembly of claim 1, the bonnet assembly further comprising a second bushing within the actuator bonnet, wherein second bushing surrounds the stem of the piston.

9. A pneumatic actuator assembly, comprising:

a valve body comprising a fluid passageway, the valve body having a first main side and an opposite second main side, the first main side having a top surface defining a plane; and a first actuator and a second actuator each coupled to the valve body by a bonnet assembly such that the first and second actuators extend from the plane defined by a top surface of the first main side of the valve body, wherein the bonnet assembly of each of the first and second actuators comprises:

a bonnet body having a first end opposite a second end, wherein the first end includes external threads;

a nut threadedly connected to the second end of the bonnet body;

an actuator bonnet, wherein the nut partially surrounds the actuator bonnet; and a bushing within the actuator bonnet and the nut, wherein the bushing surrounds a stem of a piston, wherein the stem is biasable relative to the fluid passageway of the valve body, and wherein the actuator bonnet is rotatable about a lengthwise axis extending through a center of the stem of the piston;

wherein the valve body includes first and second openings defined in the top surface, the first and second openings having internal threads for receiving the external threads of the respective first ends of the bonnet bodies of the first and second actuators; and wherein the first and second openings define respective lengthwise axes, where the lengthwise axis of the first opening is oriented perpendicular to the plane defined by the top surface of the first main side, and the lengthwise axis of the second opening is oriented at an oblique angle with respect to the plane defined by the top surface of the first main side.

10. The pneumatic actuator assembly of claim 9, wherein the bonnet body comprises an internal flange, and wherein the bushing is in abutment with the internal flange.

11. The pneumatic actuator assembly of claim 9, wherein the first end of the bonnet body is threadably connected with the valve body or integrally formed with the valve body.

12. The pneumatic actuator assembly of claim 9, the bonnet assembly further comprising a retainer extending around the actuator bonnet, wherein the retainer is in abutment with the nut.

13. The pneumatic actuator assembly of claim 9, wherein the actuator bonnet comprises a first end coupled to a housing, wherein the actuator bonnet has an exterior flange, and wherein the nut is in abutment with the exterior flange.

14. A method of operating a pneumatic actuator assembly, the method comprising:

coupling a first actuator to a valve body using a first bonnet assembly and coupling a second actuator to the valve body using a second bonnet assembly, wherein the valve body has a first main side and an opposite second main side, the first main side having a top surface defining a plane, wherein the first and second actuators extend from the plane defined by the top surface of the first main side, wherein the bonnet assembly of each of the first and second actuators comprises:

a bonnet body having a first end opposite a second end, wherein the first end includes external threads;

a nut threadedly connected to the second end of the bonnet body;

an actuator bonnet, wherein the nut partially surrounds the actuator bonnet; and a bushing within the actuator bonnet and the nut, wherein the bushing surrounds a stem of a piston; and rotating the actuator bonnet about a lengthwise axis extending through a center of the piston stem to orient an air connection port of a housing of the first actuator, wherein the actuator bonnet and the housing rotates relative to the nut and to the bonnet body;

wherein the valve body includes first and second openings defined in the top surface, the first and second openings having internal threads for receiving the external threads of the respective first ends of the bonnet bodies of the first and second actuators; and wherein the first and second openings define respective lengthwise axes, where the lengthwise axis of the first opening is oriented perpendicular to the plane defined by the top surface of the first main side, and the lengthwise axis of the second opening is oriented at an oblique angle with respect to the plane defined by the top surface of the first main side.

15. The method of claim 14, further comprising threadably connecting the first end of the bonnet body to the valve body.

16. The method of claim 14, further comprising:

orienting the first actuator perpendicular to a plane defined by a top surface of the valve body; and orienting the second actuator at a non-zero angle relative to the first actuator.

17. The method of claim 14, further comprising coupling a first end of the actuator bonnet to the housing.

18. The method of claim 14, further comprising positioning the nut in abutment with an exterior flange of the actuator bonnet.

* * * * *